United States Patent
Welsh et al.

(10) Patent No.: US 6,199,932 B1
(45) Date of Patent: Mar. 13, 2001

(54) VEHICLE SUN SHADE

(76) Inventors: James M. Welsh; Joe LePire, Jr., both of c/o 4500 Delancey Dr. Suite 3, Las Vegas, NV (US) 89103

( * ) Notice: Subject to any disclaimer, the term of this patent is extended or adjusted under 35 U.S.C. 154(b) by 0 days.

(21) Appl. No.: 09/494,788

(22) Filed: Jan. 31, 2000

(51) Int. Cl.[7] .................................................. B60J 1/00
(52) U.S. Cl. ........................... 296/77.1; 296/183; 296/78
(58) Field of Search .............................. 296/77.1, 83, 79, 296/102, 107.02, 97.21, 78, 141

(56) References Cited

U.S. PATENT DOCUMENTS

| | | | | |
|---|---|---|---|---|
| 3,561,785 | * | 2/1971 | Kidder | 296/102 |
| 4,013,315 | * | 3/1977 | West | 296/83 |
| 4,621,859 | * | 11/1986 | Spicher | 296/78 |
| 4,641,879 | * | 2/1987 | Kassai | 296/78 |
| 4,652,037 | * | 3/1987 | Thau et al. | 296/83 |
| 4,795,205 | * | 1/1989 | Gerber | 296/77.1 |
| 4,930,832 | * | 6/1990 | Shelton | 296/107 |
| 5,259,656 | * | 11/1993 | Carroll | 296/77.1 |
| 5,310,235 | * | 5/1994 | Seymour et al. | 296/77.1 |
| 5,388,881 | * | 2/1995 | Spencer et al. | 296/77.1 |
| 5,588,690 | * | 12/1996 | Showalter | 296/77.1 |
| 5,788,317 | * | 8/1998 | Nation | 296/141 |
| 5,975,613 | * | 11/1999 | Sippel | 296/77.1 |
| 6,012,756 | * | 1/2000 | Clark-Dickson | 296/77.1 |
| 6,068,322 | * | 5/2000 | Kuester | 296/97.21 |

* cited by examiner

*Primary Examiner*—Joseph D. Pape
*Assistant Examiner*—Kiran B. Patel
(74) *Attorney, Agent, or Firm*—Robert Ryan Morishita; Anderson & Morishita, L.L.C.

(57) ABSTRACT

A portable, removable sun shade comprised of sun reflective mesh material for use in an open cockpit vehicle having a roof structure or other supporting members, if and as required, depending upon the roof configuration resting upon the supporting members of the vehicle, which shades and protects the occupants and some interior components of the vehicle by absorbing, filtering and reflecting a significant portion of the sun's rays and flying objects while the vehicle is in motion. The sun shade effectively serves to reduce the temperature in the seating compartment as compared to the exterior ambient temperature while exposed to the sun's rays. The sun shade method of attachment to the vehicle is by virtue of a fastening strap comprised of the sun reflective mesh material which wraps around supporting members of the vehicle and then, utilizing a fastening method to the sun shade, fastens to the sun shade itself.

7 Claims, 1 Drawing Sheet

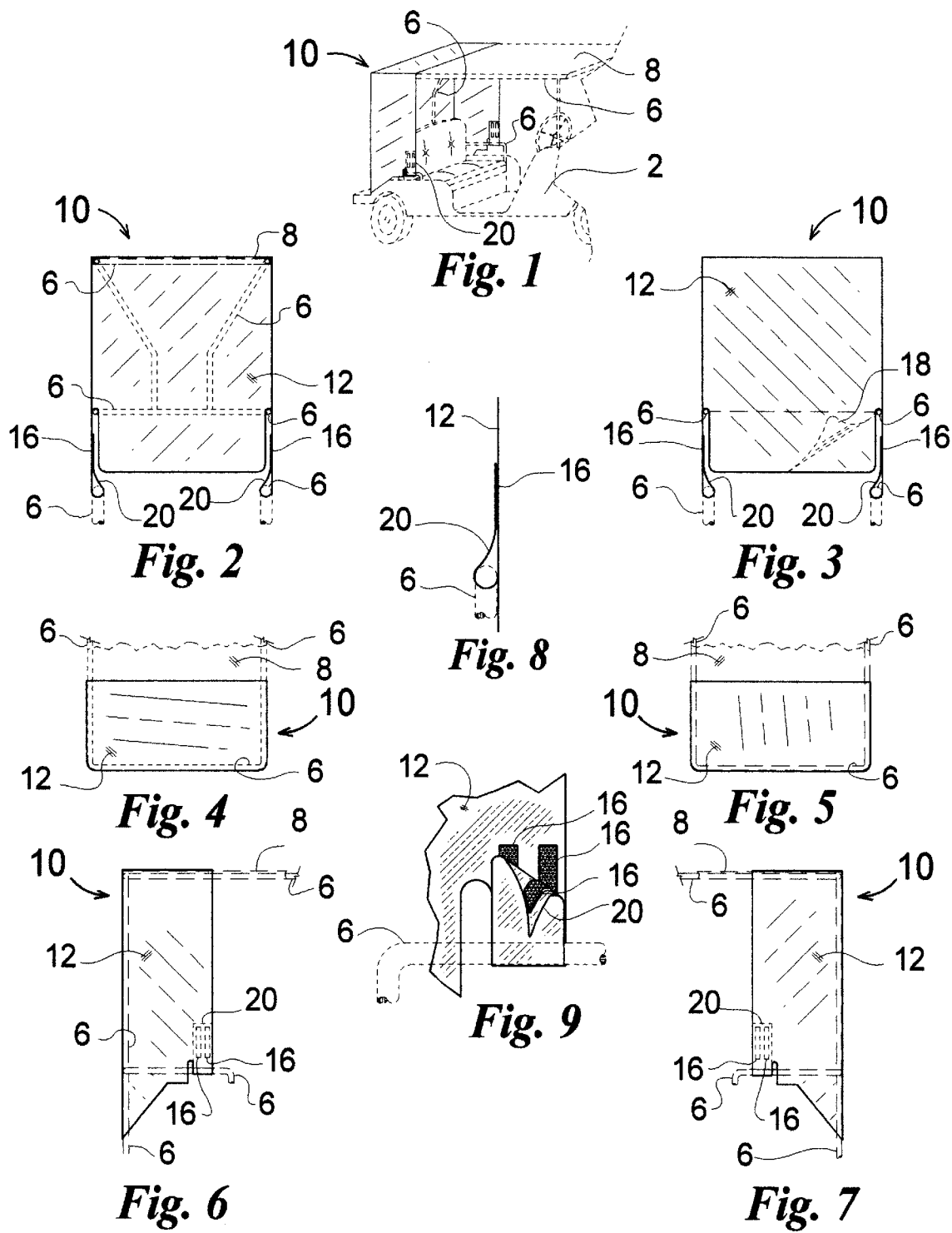

VEHICLE SUN SHADE

CROSS-REFERENCE TO RELATED APPLICATIONS

| | | | |
|---|---|---|---|
| 4,013,315 | 3/22/77 | G. L. West | 296/83 |
| 4,825,889 | 5/2/89 | Monteith | 135/88 |
| 4,877,074 | 10/31/89 | Castellano | 160/84.1 |
| 5,010,941 | 4/30/91 | Ross, Sr. et al | 160/330 |
| 5,146,967 | 9/15/92 | J. W. Chapman | 150/159 |
| 5,314,226 | 1/25/93 | Tovar | 296/97.7 |
| 5,259,656 | 11/9/93 | L. W. Carroll | 296/77 |
| 5,310,235 | 5/10/94 | Seymour et al | 296/77 |
| 4,621,859 | 11/11/86 | K. N. Spicher | 296/771 |
| 4,652,037 | 3/24/87 | Thau et al | 296/78R |
| 4,671,334 | 6/9/87 | Yadegar | 160/84R |
| 4,795,205 | 1/3/89 | CE Gerber | 296.771 |
| 5,388,881 | 2/14/95 | Spencer | 296/77.1 |
| 5,393,118 | 2/25/95 | Welborn | 296/147 |
| Des. 363,265 | 10/17/95 | Althoff | D12/401 |
| 5,588,690 | 12/31/96 | Showalter | 296.77.1 |
| 5,694,998 | 12/9/97 | Chen | 160/370.21 |
| 5,741,041 | 4/21/98 | Sullivan | 296/100 |
| 5,762,124 | 6/9/98 | Tseytlin | 160/370.23 |
| 5,816,310 | 10/6/98. | Wu | 296/136 |
| 5,788,317 | 8/4/98 | Nation | 296.141 |
| 5,921,609 | 7/13/99 | Mills | 296/138 |

STATEMENT REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

It is well known that the rays of the sun which penetrate open cockpit vehicles can have a deleterious effect not only upon the human operator and occupants of the vehicle but also causes deterioration of interior components of the vehicle that are exposed to those rays. Such harmful effects include exposure to ultraviolet rays and excessive heat. Other areas of consideration in the development of prior art inherent in the open cockpit vehicle include protection from inclement weather, wind, dirt particles, flying objects and insects.

The need for protection from the sun's rays is quite evident; sun shades, screens, covers and enclosures for vehicles are known in the art and exemplary of such prior art structures are those disclosed and cross-referenced above and discussed below. For example, U.S. Pat. No. 4,825,889 Monteith, May 2, 1989, discloses a rectangular, water impervious, non-transparent vehicle sun shade which covers the entire vehicle or the passenger compartment of a cab or closed cockpit vehicle or airplane. The shade utilizes elastic cords and plastic coated hooks to secure the shade to the vehicle. However, the shade does not permit operation of the vehicle while the shade is in place. A similar result occurs is the sun shield for automobile disclosed in U.S. Pat. No. 5,816,310, Wu, Oct. 6, 1998. The sunshades in U.S. Pat. No. 4,671,334, Yadegar, Jun. 9, 1987, U.S. Pat. No. 5,762,124 , Tseytlin, Jun. 6, 1998, and U.S. Pat. No. 4,877,074, Castellano, Oct. 31, 1989, are positioned behind the windshield of the vehicle and do not permit operation of the vehicle while the sunshade is in place. U.S. Pat. No. 5,694, 998 , Chen, Dec. 9, 1997, and U.S. Pat. No. 5,314,226, Tovar, 5,314,226, disclose a vehicle window sunshade and vehicle sunshield, repectively, which are installed in the window of the vehicle. A common disadvantage of windshield and window related shades or screens is lack of uniformity in windshield and window dimensions. Although Chen discloses a portable, adjustable window sunshade utilizing suction cups, it is utilized while the vehicle is stored or parked. The foregoing references are discussed primarily for informational purposes to illustrate examples of prior art in the areas of sun screens and sun shades, especially in light of the fact they pertain to closed cockpit vehicles.

The shade assembly disclosed in U.S. Pat. No. 5,921,609, Mills, Jul. 13, 1999, reveals an application for an open cockpit vehicle, such as golf cart, wherein the shade rolls up and down covering the entrances to the passenger compartment. It seems a major disadvantage of this invention would be a flapping movement of the shade while the vehicle is in operation as the edge of the shade faces forward into wind caused from the vehicle's forward motion. Additionally, the shade U.S. Pat. No. 5,741,041, Sullivan, Apr. 21, 1998, discloses a rollup, portable, removable rear cover spanning from the roof of the golf cart and extending over the rear area where the golf bags are stored. The assembly utilizes shock cords, grommets and loops to secure the cover. The upper portion of the cover is composed of transparent plastic, facilitating, rear visibility, and a lower portion composed of woven fabric. Although Sullivan addresses the need to protect the golfing equipment in the rear of the golf cart, the invention would not provide significant protection to the occupants of the vehicle from the sun's rays or inclement weather.

A wide variety of golfcart and vehicle covers has been described in the prior art, as for example, the following:

U.S. Pat. No. Des. 363,265, Althoff, Oct. 17, 1995, is an ornament design for a golf cart cover.

U.S. Pat. No. 5,310,235, Seymour et al, May 10, 1994, describes an easily foldable transparent weather-shield which completely surrounds the golf cart.

U.S. Pat. No. 5,259,656, L. W. Carroll, Nov. 9, 1993, describes a rolled-up enclosure having roll-up panels and a top panel.

U.S. Pat. No. 5,146,967, J. W. Chapman, Sep. 15, 1992, is limited to covers for golf carts.

U.S. Pat. No. 5,010,941, Ross, Sr. et al., Apr. 30, 1991, describes a curtain which extends from the rear of the roof structure and is resiliently secured to the golf bags.

U.S. Pat. No. 4,795,205, C. E. Gerber, Jan. 3, 1989, utilizes horizontal upper tracks and vertical lower tracks with a windshield having rollers which slide in the tracks.

U.S. Pat. No. 4,621,859, K. N. Spicher, Nov. 11, 1986, utilizes a pipe frame which holds transparent weather-resistant sheets.

U.S. Pat. No. 4,013,315, G. L. West, Mar. 22, 1977, describes panels attachable by suction cups and hooks.

U.S. Pat. No. 4,652,037, Thau et al., Mar. 24, 1987, describes a transparent vinyl protective cover for the cab portion of a fork lift truck with rollup door and window panels.

U.S. Pat. No. 5,393,118, Welborn, Feb. 28, 1995, discloses a custom fitting closure for golf carts that includes horizontally swinging doors framed by U-shaped members having hinges.

U.S. Pat. No. 5,588,690, Showalter, Dec. 31, 1996, discloses a double back golf cart enclosure for removable installation about a golf cart or similar vehicle for protecting the occupants from inclement weather.

U.S. Pat. No. 5,788,317, Nation, Aug. 4, 1998, discloses a dual paneled golf cart enclosure having a plurality of pairs of inner panels and outer panels, which may be a combination of either mesh and plastic vinyl or plastic vinyl and plastic vinyl some of which are transparent. Either one or both pairs of panels can be secured in a rolled up position around the perimeter of the roof.

BRIEF SUMMARY OF THE INVENTION

The present invention comprises a removable, portable sun shade that can be readily attached to an open cockpit vehicle with a fixed roof structure, or upon supporting members as may be required depending upon vehicle configuration, including but not limited to, such a vehicle as a golf cart, utility cart, construction vehicle, agricultural vehicle, earth working vehicle, harvesting vehicle, jeep, dune buggy, off road vehicle, hunting vehicle, general utility vehicle and the like. It is the primary object of the present invention to provide a portable, attachable shade constructed of sun reflective mesh material that serves to shade and protect the operator and/or occupants of the vehicle, while it is either parked or in motion, from exposure to the sun's rays and its consequent, excessive heat in the passenger compartment. The sun reflective mesh material substantially absorbs, filters and reflects the sun's rays while providing ventilation and visibility in the passenger compartment. The shade also serves to protect the occupants from flying objects from the side and rear which would be prevalent in a golf course, construction site, pastoral and off road setting. The sun shade can be manufactured at relatively low cost without utilizing elaborate fasteners because the sun shade is supported by the roof structure, or supporting members, if applicable or required by the vehicle configuration, and attached to side bars on the vehicle by means of a strap fastening method comprised of the mesh material itself. It is an object of this invention to provide an improvement which overcomes the aforementioned inadequacies of the prior art devices and provides an improvement which is a significant contribution to the advancement of vehicle shade and enclosure art.

BRIEF DESCRIPTION OF THE SEVERAL VIEWS OF THE DRAWING

In the following detailed description, references will be made to the attached drawings in which:

FIG. 1 is a front perspective view of the vehicle sun shade of the present invention in place on the vehicle, namely, in this instance, a golf cart.

FIG. 2 is the front view of the vehicle sun shade of the present invention.

FIG. 3 is the rear view of the vehicle sun shade of the present invention.

FIG. 4 is the top view of the vehicle sun shade of the present invention.

FIG. 5 is the bottom view of the vehicle sun shade of the present invention.

FIG. 6 is the right view of the vehicle sun shade of the present invention.

FIG. 7 is the left view of the vehicle sun shade of the present invention.

FIG. 8 is the enlarged edge view of the fastening strap attachment of the vehicle sun shade.

FIG. 9 is the enlarged section view of the fastening strap attachment of the vehicle sun shade.

DETAILED DESCRIPTION OF THE INVENTION

This invention relates to a portable, removable vehicle sun shade 10 for an open cockpit vehicle 2 such as a golf cart, construction vehicle, utility cart, agricultural vehicle, earth working vehicle, harvesting vehicle, jeep, dune buggy, off road vehicle, hunting vehicle, general utility vehicle, or the like, with a fixed roof structure 8, or other supporting member 6, as required, comprised of a sun reflective mesh material 12 which shades and protect the occupants and some interior components of the vehicle by absorbing, filtering and reflecting a significant portion of the rays of the sun. Referring now to the drawings, in FIG. 1, the vehicle 2 is illustrated, for example, as a golf cart having a roof structure 8 with supporting members 6 with the invention 10 in place and comprised of the sun reflective mesh material 12. A liftable rear flap 18 to gain access to the rear area of the vehicle 2 from the passenger compartment is indicated in FIG. 2 and FIG. 3.

The method of attachment of the sun shade 10 to the vehicle is shown in FIG. 9 which is an enlarged section view of the fastening strap 20 comprised of sun reflective mesh material 12 which wraps around the supporting members 6 then utilizing a fastening method 16 to the sun shade 10 itself.

The vehicle sun shade 10 includes a roof panel which corresponds to the configuration of the roof structure 8 of the vehicle rearward above the seating compartment to the rear of the roof structure 8 and extends laterally to the right and left sides of the roof structure 8. The top portion of the side panels of the sun shade FIG. 6 and FIG. 7 are sewn to the roof panel, or by any other method suggested by the manufacturer of the sun reflective mesh material, of the sun shade 10 and extend from the front portion of the seating compartment to the rear edge of the roof 8 providing free and unrestrained ingress and egress into the seating compartment. The front lower portion of the side panels of the sun shade 10 as in FIG. 6, FIG. 7 and FIG. 9 are notched providing a fastening strap 20 of the sun shade material 12 which serves to wrap around the supporting members 6 on the vehicle. A fastener method 16 secures the fastening strap 20 to the sun shade 10 allowing the installer to adjust the tension of the sun shade 10 with respect to the roof panel as well as secure the side panels to the vehicle 2.

Installation of the vehicle sun shade 10 is accomplished by sliding the sun shade 10 forward over the roof structure 8 of the vehicle 2, or supporting members 6, if applicable or required by vehicle configuration, and wrapping the fastening straps 20 around the supporting members 6 on the sides of the vehicle next to the seating compartment.

The novel feature of this invention 10 comprises the use of sun reflective mesh material 12 that effectively absorbs, filters and reflects a substantial portion of the sun's rays thereby shading the occupants and some interior components from those rays as well as reducing the internal temperature of the seating compartment when exposed to the sun's rays. The mesh material 12 allows ventilation in the seating compartment and does not appreciably hamper visibility to the sides and rear from the seating compartment. Another important feature of the present invention is the unrestricted ingress and egress into the seating compartment and rear area of the vehicle 2; the liftable flap 18 provides access to the rear area of the vehicle from within the seating compartment. The present invention also provides protection from flying objects, flying debris, rocks, insects and other animals from the side and rear of the vehicle.

The foregoing has broadly outlined the more pertinent and important features of the present invention in order that the present contribution to the art be more fully appreciated. It is understood that the present disclosure may be subject to change or additions in the areas of construction and/or arrangement of parts may be resorted to without departure from the spirit and scope of the invention.

We claim:

1. A device for shading and enclosing the interior of an open cockpit vehicle including substantially vertical supports defining open side ports and an open rear port and horizontal supports at the base of said vertical supports, said vehicle divided into a rear cargo compartment at the rear of the vehicle and a seating compartment at the front of the vehicle accessible through an ingress at the front of the side ports, comprising:

a roof panel;

two side panels formed from a sun reflective material attached to the roof panel, each side panel extending from the vertical supports defining the rear port of the vehicle to the ingress such that said side panel covers a portion of the open side port while leaving the ingress unobstructed, each side panel including a strap having mating fastener elements thereon such that when the fastener elements are connected, said strap forms a releasable loop adapted to secure the side panels to said vehicle; and a rear panel formed from a sun reflective material attached to the roof panel and the side panels covering the rear port of the vehicle.

2. The device of claim 1 wherein said straps and side panels are integrally formed.

3. The device of claim 1 wherein said fastener elements are hook and pile fasteners.

4. The device of claim 1 further comprising a liftable flap in said rear panel allowing access to said rear cargo compartment from said seating compartment.

5. A device for shading and enclosing the interior of an open cockpit vehicle including a roof supported by substantially vertical supports defining open side ports and an open rear port and horizontal supports at the base of said vertical supports, said vehicle divided into a rear cargo compartment at the rear of the vehicle accessible from said cockpit through the rear port and a seating compartment at the front of the vehicle accessible through an ingress at the front of the side ports, comprising:

a roof panel covering a portion of the roof;

two side panels formed from a sun reflective mesh material attached to the roof panel, each side panel extending from the vertical supports defining the rear port of the vehicle to the ingress such that said side panel covers a rear portion of the open side port while leaving the ingress unobstructed, each side panel including an integral strap having mating fastener elements thereon such that when the fastener elements are connected, said strap forms a releasable loop around said horizontal supports to removably secure the side panels to said vehicle; and a rear panel formed from a sun reflective mesh material attached to the roof panel and the side panels covering the open rear port of the vehicle, said rear panel including a liftable flap allowing access to said rear cargo compartment.

6. The device of claim 5 wherein said fastener elements are hook and pile fasteners.

7. A device for shading and enclosing the interior of an open cockpit vehicle including a roof supported by substantially vertical supports defining open side ports and an open rear port and horizontal supports at the base of said vertical supports, said vehicle divided into a rear cargo compartment at the rear of the vehicle accessible from said cockpit through the rear port and a seating compartment at the front of the vehicle accessible through an ingress at the front of the side ports, said roof covering only the seating compartment of said vehicle, comprising:

a roof panel formed from a sun reflective mesh material covering a portion of the roof;

two side panels formed from a sun reflective mesh material attached to the roof panel, each side panel extending from the vertical supports defining the rear port of the vehicle to the ingress such that said side panel covers a rear portion of the open side port while leaving the ingress unobstructed, each side panel including an integral strap having, mating hook and loop fastener elements thereon such that when the fastener elements are connected, said strap forms a releasable loop around said horizontal supports to removably secure the side panels to said vehicle; and a rear panel formed from a sun reflective mesh material attached to the roof panel and the side panels coveringthe open rear port of the vehicle, a portion of said rear panel free from attachment to said side panels to form a liftable flap allowing access to said rear cargo compartment.

* * * * *